United States Patent
Smith et al.

(10) Patent No.: US 7,398,304 B2
(45) Date of Patent: Jul. 8, 2008

(54) GENERAL DEPENDENCY MODEL FOR INVALIDATING CACHE ENTRIES

(75) Inventors: Adam Wade Smith, Redmond, WA (US); Robert Michael Howard, Frisco, TX (US); Patrick Yu-Kwan Ng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 913 days.

(21) Appl. No.: 10/602,122

(22) Filed: Jun. 23, 2003

(65) Prior Publication Data

US 2005/0015463 A1    Jan. 20, 2005

(51) Int. Cl.
*G06F 15/16* (2006.01)
(52) U.S. Cl. .............. 709/218; 709/219; 707/100; 707/103
(58) Field of Classification Search ............ 709/218, 709/219; 707/100, 103
See application file for complete search history.

(56) References Cited

U.S. PATENT DOCUMENTS

| | | | |
|---|---|---|---|
| 5,897,634 A | 4/1999 | Attaluri et al. | 707/8 |
| 6,026,413 A | 2/2000 | Challenger et al. | 707/202 |
| 6,185,608 B1 | 2/2001 | Hon et al. | 709/216 |
| 6,304,879 B1 * | 10/2001 | Sobeski et al. | 707/103 R |
| 6,493,720 B1 | 12/2002 | Chu et al. | 707/104 |
| 6,502,093 B1 | 12/2002 | Bhatt et al. | 707/3 |
| 7,096,418 B1 * | 8/2006 | Singhal et al. | 715/501.1 |
| 2003/0217071 A1 | 11/2003 | White et al. | 707/203 |

FOREIGN PATENT DOCUMENTS

EP    0959416    11/1999

OTHER PUBLICATIONS

Challenger, Jim, et al. "A Scalable System for Consistently Caching Dynamic Web Data" Infocom '99. Eighteenth Annual Joint Conference of the IEEE Computer and Communications Societies. New York, NY, Mar. 21-25, 1999, Piscataway, NJ, Mar. 21, 1999, pp. 294-303.
"Dynamic Caching: Dynamic Pages Delivered Faster" Spidercache, Inc., Nov. 2000, Vancouver Canada.
"Where XCache Fits In" XCache Technologies, Nov. 29, 2001, retrieved from the Internet: URL:http://www.archieve.org/web/20010609055857/www.xcache.com/home/printer_xcache_where_xcache_fits_in.htm.
Mohan, C. "Caching Technologies for Web Applications" Proceedings of the International Conference on Very Large Databases, Sep. 12, 2001, pp. 1-31.

* cited by examiner

*Primary Examiner*—Nathan J. Flynn
*Assistant Examiner*—Kyung H Shin
(74) *Attorney, Agent, or Firm*—Workman Nydegger (57) ABSTRACT

Systems, methods, and computer products for deriving custom cache dependencies are explained. A framework that includes an extensible cache dependency base class that can be used to derive custom cache dependency classes for invalidating cache entries on some custom condition is disclosed. In some embodiments, a Web page server includes a cache and the framework including the extensible cache dependency base. Methods are disclosed for causing a cache entry to be dependent on a customized cache dependency and for invalidating cache entries based on customized cache dependencies. For example, cache entries can depend on and be purged based on dependencies on database tables and Web services.

30 Claims, 4 Drawing Sheets

GENERAL DEPENDENCY MODEL FOR INVALIDATING CACHE ENTRIES

BACKGROUND OF THE INVENTION

1. The Field of the Invention

The invention generally relates to managing cached content. More specifically, the invention relates to extending cache dependency classes such that developers can create custom cache dependencies.

2. Background and Relevant Art

In modern computer systems and network systems, data caching is an effective tool to speed-up the delivery of data to those who request it. Generally, data caching involves storing frequently requested data at a location where the data can be quickly retrieved. In one example, data stored in physical memory of a computer system can be retrieved quicker than data stored on a hard drive in the computer system. This is in part due to hard drives typically having greater data retrieval latencies as compared to physical memory. Likewise, data stored on a hard drive or in memory on a server computer system can be accessed more efficiently than data stored at a remote database. Further, the use of cached data can reduce the number of calculations needed to generate content for delivery to a requesting client computer system.

Modem networks have facilitated the ability to broadly transfer digital information to and from various locations. One way of making data available for transport is by creating a static file such as an HTML file that can be downloaded from the server to a client computer system where it can be viewed. Static files can be cached in a variety of locations including at a server computer system, in a regional database, or even locally on the client computer system. When computer system static files are stored at a client computer system, retrieval and display by the client computer system is, for all practical purposes, instantaneous. Even when static files are stored directly on a server computer system connected to the client computer system (commonly known as output caching), retrieval of cached content can occur relatively quickly. Further, because of their static nature, static files can be cached for long periods of time, essentially indefinitely.

Unfortunately, static files cannot include real-time or custom content. Often, it is desirable to present content that changes on a periodic basis or that is formed from a calculation or manipulation of other content. While such content can still be cached, the cached values of the content are valid only for a limited duration. As such, the cache must be refreshed to ensure that the data is valid.

One technology that has assisted Web developers in creating Web pages and Websites is the use of scripts or modular pieces of computer executable code that are run on a Web page server such as, for example, an Internet Information Server. Scripts can be embedded among other HTML tags to create Web pages that are dynamic and customizable. Just as objects can be called in programs such as those written in Visual Basic, JavaScript, and C#, so to can the same objects be called in scripts that are based on these and other languages.

A class is an object within a programming framework such as the ASP.NET framework. The ASP.NET framework comprises thousands of classes that Web page developers can use to develop Web pages. In a manner similar to accessing a file through a directory path, classes can be accessed by reference to a particular name space. For example, a reference to the name space System.WinForms.Form provides an indication of the location of a particular class. Classes can be associated with properties, events and methods. A property can be thought of as some variable assignment or a setting in a corresponding class (e.g., x=5). An event is a flag that is raised upon the occurrence of an event. The event can be read by other classes or other applications to cause some action to be taken. A method provides a way to invoke the functionality of a corresponding class to perform an action (e.g. output data to a display device). A method defines how functionality is offered to external components.

To facilitate the caching of content and hence improve performance of a Web page server, a programming framework can include classes for retrieving data from various locations such as for example, files, databases and Web services, and classes for manipulating data through various operations. In some environments, a Web page server computer system with access to these classes (e.g., an ASP server) may create and store HTML code based on real time content, which is to be sent to the client computer system in an output caching scenario. In other environments, a Web page server computer system may cache content, such as an XML file, locally at the Web page server computer system so that the content does not need to be retrieved or recalculated each time a Web page that is to include the content is requested.

Some programming frameworks allow Web developers to create instructions that, when executed, cause content to be stored in cache. For example, to insert an entry into cache, the following instruction can be executed: Cache.Insert([key], [value], [dependency]) where key is reference identifier for the cache entry, value is the value (or content) placed into the cache entry, and dependency is an optional argument that defines when the value for the key should be purged from the cache. Dependency is an instance of a class, for example a CacheDependency class, that can be used to cause the cache value to be dependent on the occurrence of a particular event.

Some programming frameworks support cache dependencies that cause a cached value to be dependent on either a time, a file or a key. A time cache dependency causes an entry associated with the specific dependency to be purged after the expiration of a specific period of time. For example, the Cache.Insert instruction can be implemented as follows to cause data to be dependent on time:

Cache.Insert(strCacheKey, dataset, nothing, DateTime.Now.AddMinutes(60), TimeSpan.Zero, CacheItemPriority.High), More specifically, the DateTime.Now.AddMinutes(60) instruction causes an entry in the cache to be purged from the cache after 60 minutes. Using a time cache dependency that is set too short can result in the too frequent purging of the cache and the added cost of frequently fetching data from a database or the cost of calculating data to be stored in the cache. If the time value is set to long, there is the risk that the data stored in the cache will be invalid when it is delivered to a requesting client computer system.

The Cache.Insert instruction can also be used to implement a file cache dependency that causes a cache entry to be purged if there is a change in a particular file. Further, the Cache.Insert instruction can be used to implement a key dependency that causes one or more cache entries to be purged when some other cache value stored in memory changes. Using a key dependency, the changing of one cache value can cause a number of dependent cache values to be purged from the cache.

While the three cache dependencies described above: time, file and key, are useful for keeping values stored in cache fresh, the classes that implement these dependencies are typically sealed. Thus, Web developers typically have no way to cause cache entries to be dependent on other types of events.

This prevents various other types of cache dependencies, which may make the management of the cache more efficient, from being used. Accordingly, what would be advantageous are mechanisms for extending the types of dependencies the can be used to invalidate cache entries.

BRIEF SUMMARY OF THE INVENTION

The foregoing problems with the prior state of the art are overcome by the principles of the present invention, which are directed towards methods, systems, an computer program products, for extending cache dependency classes such that developers can create custom cache dependencies. A server computer system (e.g., including a Web page server) accesses an extensible cache dependency base class and, from the extensible cache dependency base class, derives a customized cache dependency. A customized cache dependency can, for example, result in a cache entry being dependent on a change in database table (e.g., an SQL table) or a Web service.

A customized cache dependency may include an aggregate dependency such that a cache entry is dependent on a number of events. In some embodiments, the functionality of a customized cache dependency overrides the functionality of the extensible cache dependency base class. An extensible cache dependency base class can include a notify dependency changed method that monitors for an event (e.g., a change in a database table) and notifies the server computer system when the event occurs. An extensible cache dependency base class can also include a dependency dispose method that releases resources when a cache entry is removed from cache.

The server computer system accesses content, for example, from a database or a Web service, that is to be delivered to a client computer system. The server computer system creates a cache entry that associates the customized cache dependency with the accessed content. The server computer system inserts the cache entry into cache such that the validity of the cache entry (and thus also the accessed content) is dependent on the customized dependency. The server computer system can insert the cache entry into cache using the Cache.Insert method that specifies a dependency that is an instance of the customized cache dependency.

It may be that a cache entry is invalidated based on a customized cache dependency. A server computer system (e.g., including a Web page server) receives a notification that a monitored event has occurred. The notification can originate from a notify dependency changed method that was executed as a result of a creating a customized cached dependency and that monitors for the occurrence of an event associated with the customized cached dependency. In response to the notification, the server computer system invalidates (and removes) the cache entry. The server computer system calls a dependency dispose method to release any resources used by the cache entry.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims.

BRIEF DESCRIPTION OF THE DRAWINGS

In order to describe the manner in which the above-recited and other advantages and features of the invention cam be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods and computer program products for extending cache dependency classes such that custom cache dependencies can be created by developers. Embodiments of the present invention extend cache dependencies to an extensible form such that developers can develop their own custom cache dependencies. A server computer system (e.g., including a Web page server) accesses an extensible CacheDependency base class from which other customized CacheDependency classes can be derived. Customized CacheDependency classes can, among other things, utilize the cache management features of the extensible CacheDependency base class. By creating a customized CacheDependency class that derives from the extensible CacheDependency base class, a developer needs little, if any, knowledge of how the extensible CacheDependency base class is implemented to utilize the advantageous features of the extensible CacheDependency base class. The extensible CacheDependency base class abstracts implementation details from the developer.

Further, the developer can access methods of the extensible CacheDependency base class that can handle cache synchronization and cache resources management. Additionally, the extensible CacheDependency base class can be backward compatible so that existing APIs can be used with the extensible CacheDependency base class and any classes derived there from. Examples of such APIs include Cache.Insert, Cache.Add and BasePartialCachingControl.Dependency. Further, the implementation of custom cache dependencies deriving from the extensible CacheDependency base class relieves developers from having to specify a StartTime property to signal when monitoring of the cache should begin. While developers are free to implement this property, it is not required.

The extensible CacheDependency base class includes two additional methods that are publicly available such that developers of customized CacheDependency classes can invoke the purging capabilities of the extensible CacheDependency base class. The first method is a NotifyDependencyChanged method. This method is called by classes that are derived from the extensible CacheDependency base class to tell the extensible CacheDependency class that the dependent item has changed. The second new method is the DependencyDispose method. This method is a virtual method that provides a location cleanup specific to the derived class. More specifically, this method provides a location for instructions that normally would have been placed in the Dispose method of the extensible CacheDependency base class were it not for the customized CacheDependency class. As such, resources used by the customized CacheDependency class can be released for use by other modules having need of access to the resources.

The NotifyDependencyChanged method may be called by a customized CacheDependency class that depends from the extensible CacheDependency base class. The customized CacheDependency class can thus cause a cache entry to be dependent on changes in a database, on data of a Web service, or for any other reason. In this way, the cache can recognize an invalid cache entry key and remove the key (and corresponding content) from the cache.

In one illustrative example, a developer creates a custom class "SqlCacheDependency" that derives from the extensible CacheDependency base class to poll an SQL database to determine if changes have been made to the database. The SqlCacheDependency class is derived from the extensible CacheDependency base class that exists within a programming framework. Thus, the class SqlCacheDependency can call the NotifyDependencyChanged method such that a server computer system causes a dependent cache entry to be purged.

Using one embodiment of the invention, an instance of a customized CacheDependency could be implemented using the following instructions:

```
10 If (Cache ["Product"] == null {
20     SqlConnection Connection = new SqlConnection ([connection
       details]);
30     SqlDataAdapter ds = new SqlDataAdapter ("Product_
GetProducts", connection);
...
40 SqlCacheDependency dep = new SqlCacheDependency ("NorthWind",
"Products");
50 Cache.Insert("Product", ds, dep);
}
```

Line 10 of the above code checks to see if an entry "Product" is already in cache. If the entry is not in cache, then the functions in the "if" statement are performed. Line 20 establishes a connection to a database where content is to be retrieved. Line 30 retrieves data from the database using a method "Product_GetProducts" and stores the data in a variable "ds." At line 40 the variable "dep" is assigned as a dependency on the "Products" table in the "NorthWind" database. This dependency is a customized SqlCacheDependency that derives from the extensible CacheDependency base class. Line 50 then causes the data in the variable "ds" to be inserted into a cache entry referenced by the key "Product" such that the cache entry is dependent on "dep".

In this example, SqlCacheDependency is a customized cache dependency derived from the extensible CacheDependency base class. When a class deriving from the extensible CacheDependency base class is used as a dependency, the server computer system processes the class as if it were an instance of the extensible CacheDependency class. Accordingly, the server computer system is able to respond to similar behaviors exhibited by the extensible CacheDependency base class, while internally the derived class may implement its own unique functionality, such as being notified when a database query changes. The customized CacheDependency class, in this case SqlCacheDependency, overrides any methods of the extensible CacheDependency base class necessary to achieve the desired functionality. In this example, when SqlCacheDependency is notified of the database query change, it will call the base.Notify.DependencyChanged method causing the server computer system to remove the cache entry referenced by the key "Product".

While this example has been described in terms of a database change dependency, it is important to remember that the extensibility of the extensible CacheDependency base class allows for the creation of virtually any cache dependency that can be conceived by a Web developer. With the extensible model, the Web developer can build any sort of custom dependency including aggregate dependencies that are based on two or more dependencies. For example, a cache entry may be dependent on both a file and an SQL table. The following instructions show an implementation of an aggregate dependency.

```
70 if (Cache ["Product-List"] == null {
80 SqlConnection Connection = new SqlConnection ([connection details]);
90 SqlDataAdapter ds = new SqlDataAdapter ("Product_GetProducts",
connection);
100 SqlCacheDependency sqlDep = new SqlCacheDependency
("NorthWind", "Products");
120 CachDependency dep = new
AggregateCacheDependency(Server.MapPath("sales.xml"), sqlDep);
130 Cache.Insert("Product-List, ds, dep);
}
```

This code is similar to the code above labeled lines 10-50 with the exception of line 120. An aggregate cache dependency is implemented by a derived class of CacheDependency, named AggregateCacheDependency. This can be used to make entries in cache dependent on both a file (sales.xml) and the customized SqlCacheDependency that derives from the extensible CacheDependency base class. Classes derived from the extensible CacheDependency base class can also provide additional customized functionality. That is, a derived class can be developed to handle any events, methods and properties used to implement the customized functionality. For example, the derived class can be developed to a start-time (e.g. specifying a time when the CacheDependency should begin monitoring for changes), the ability to support aggregation of dependencies, support for callback mechanisms, etc. Accordingly, a developer is not limited to events, methods and properties inherent to the extensible CacheDependency base class.

Figure 1:
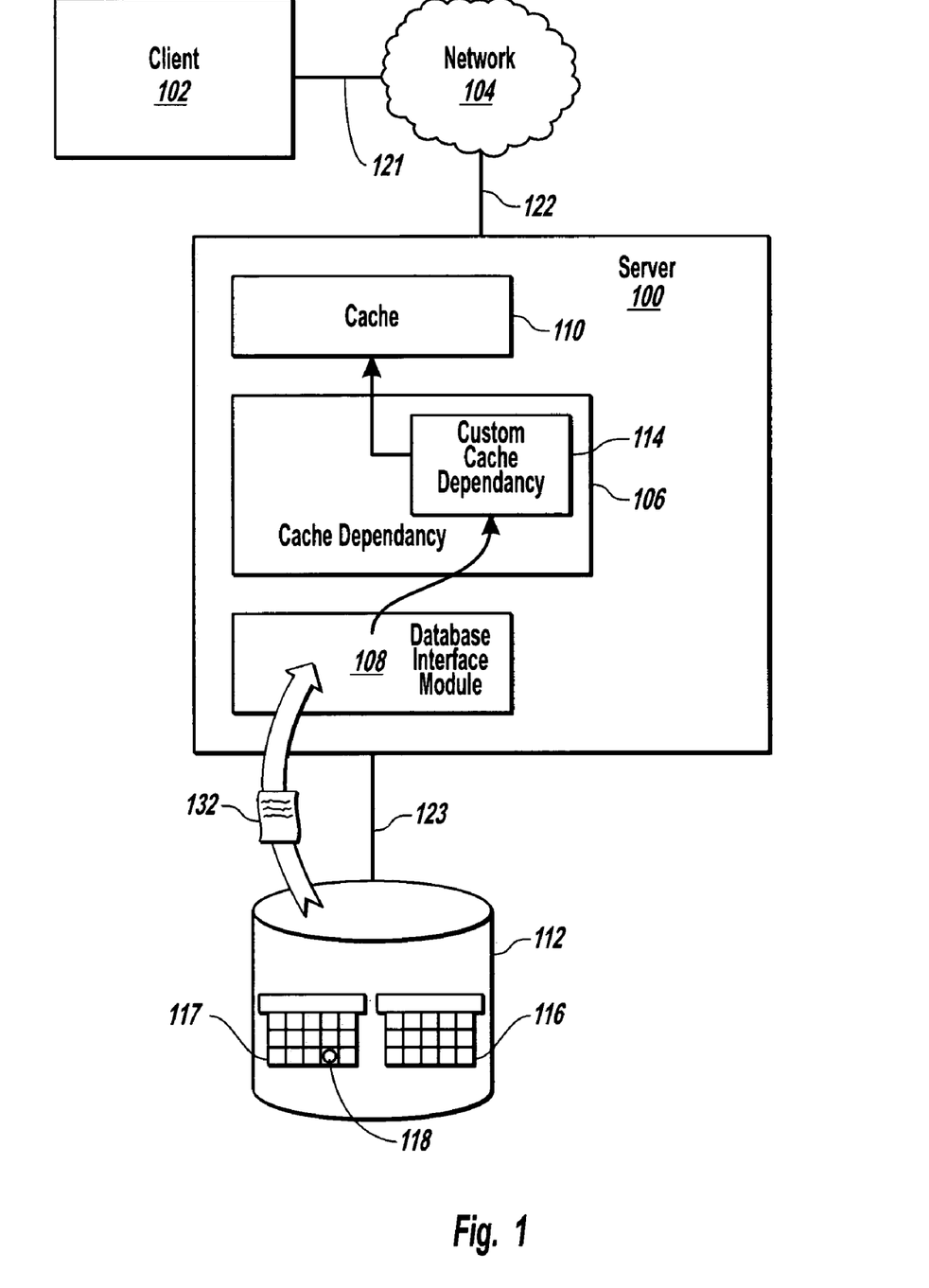
FIG. 1 illustrates an example of a Web page server implementing server side scripting and custom cache dependencies.

Referring now to FIG. 1, a suitable environment where aspects of the present invention may be practiced is shown. FIG. 1 depicts a server 100 and client 102 connected to a network 104 by corresponding links 121 and 122 respectively. The server 100 and client 102 can communicate over network 104 using a variety of protocols including HTTP. The server 100 can be an ASP.NET server, such that it can deliver dynamic content in the form of dynamic Web pages to the client 102. The server 100 includes various classes and modules including an extensible CacheDependency class 106 and a customized CacheDependency class 114 . The server 100 also includes a cache 110 that may be located in the physical memory of the server 100 or in any other convenient location.

The server 100 is coupled to a database 112 by link 123. Database 112 may be any suitable database such as for example, an SQL database or Oracle database. In other embodiments of the invention, the database 112 may represent an XML service or any other source of data.

Illustratively, the client 102 requests certain content from the server 100. For example, client 102 may access a URL that requests a Web page from the server 100. The server 100 checks the cache 110 to determine if the requested content (e.g., data in a Web page) is in the cache 110. If the content is not in the cache 110, the database interface module 108 can request the content from the database 112. When appropriate, content, such as, for example content 132, is retrieved and returned to a database interface module 108.

Alternatively, the requested content may be some calculated value or some manipulation of content retrieved from some database such as database 112. It may be that database interface module 108 calculates or manipulates content as appropriate. The content is then sent to the client 102, for example, in one or more HTTP messages. The content can also be added to the cache 110 using a Cache.Insert method. The Cache.Insert method specifies a custom dependency defined by a customized CacheDependency class 114 that derives from the extensible CacheDependency base class 106.

While the content remains in the cache 110, it can be more efficiently delivered to any client requesting the content. The content remains in the cache 110 until a method such as a NotifyDependencyChanged method is invoked by the customized CacheDependency class 114. The content is purged from the cache on the calling of the NotifyDependencyChanged method. Subsequent requests for the content by a client require that the content be re-fetched from the database 112 and/or recalculated by the database interface module 108.

The customized CacheDependency class 114 may cause the cache 110 to be purged when there is a change in the database 112. In this example, while fetching data from the database 112 may be resource intensive, polling the database 112 for changes, on the other hand, uses less resources. The database 112 may comprise database tables that store information in the database 112 such as the database table 116. Another database table 117 may further comprise a flag entry 118 that indicates if changes have been made to information in the database table 116. The database table 117 may contain flags for other tables in the database that have custom dependencies. In one embodiment, the flag entry 118 may be incremental such that each change in the database table 116 causes the flag entry 118 to incrementally increase its value. The customized CacheDependency class 114 may be designed to remove cache entries when an increase in the flag entry 118 is detected.

Figure 2:
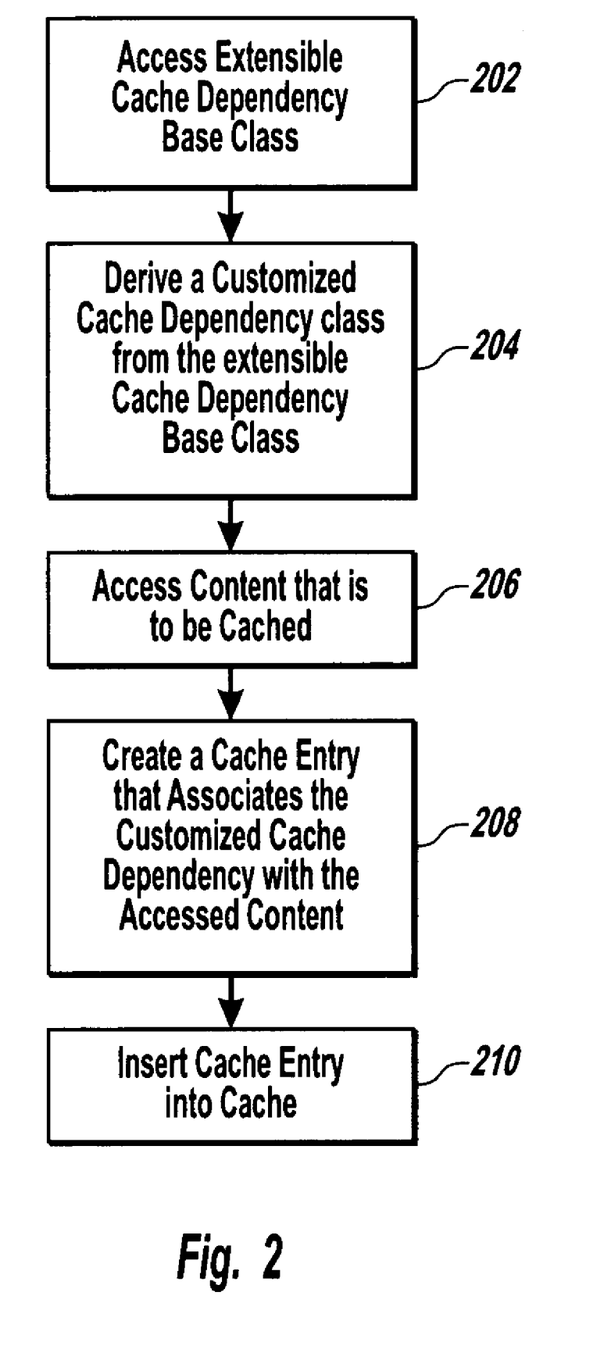
FIG. 2 is an example flow chart illustrating one embodiment of a method for causing a cache entry to be dependant on a custom dependency.

Referring now to FIG. 2, a flow chart illustrating a method for inserting a dependency entry is shown. The method of FIG. 2 includes an act of accessing an extensible CacheDependency base class (act 202). Act 202 can include a server computer system accessing an extensible CacheDependency base class. For example, server 100 can access extensible CacheDependency class 106. Server 100 may access CacheDependency class 106 as a result of executing instructions developed by a web page developer, other software developer or as part of some program module.

The method of FIG. 2 includes deriving a customized CacheDependency class from the extensible CacheDependency base class (act 204). Act 204 can include a server computer system deriving a customized CacheDependency class from the extensible CacheDependency base class. For example, server 100 can derive customized CacheDependency class 114 from extensible CacheDependency class 106. Server 100 may derive customized CacheDependency class 114 as a result of executing instructions developed by a web page developer, software developer or as part of some program module, to create a customized CacheDependency. Server 100 may also derive customized CacheDependency class 114 from a number of sources, including but not limited to: an external sensor connected to a computer, such as a thermometer, that triggers an event whenever conditions change; a sports scoreboard program that triggers a change whenever the score in a game changes; a network management program that triggers an event whenever the network configuration changes (such as a computer being added or removed from the network); and a directory program that triggers an event whenever the directory changes (such as a person being added or removed).

The method of FIG. 2 includes accessing content (act 206). Act 206 can include a server computer system accessing content that is to be included in a Web page for delivery to a client computer system. For example, server 100 can access content that is to be included in a Web page for delivery to client 102. Accessing content can include creating or manipulating the content. Content can be accessed from a variety of different locations, such as, for example, from databases and Web services. For example, server 100 can access data stored at database 112. Database interface module 108 or other suitable modules can appropriately format the data for inclusion in a Web page.

The method of FIG. 2 includes an act of creating a cache entry that is associated with the customized CacheDependency class (act 208). Act 208 can include a server computer system creating a cached entry that is associated with the customized CacheDependency. For example, server 100 can create a cache entry that is associated with customized CacheDependency class 114. A cache entry is created in one embodiment by a variable definition statement made by the server 100 (e.g., similar to line 50 of the above described instructions).

The method of FIG. 2 includes an act of inserting the cache entry into cache (act 210). Act 210 can include a server computer system inserting the cached entry into a cache location at the server computer system. For example, server 100 can insert a cache entry into cache 100. A cached entry can be inserted into cache such that the validity of the cached entry (and thus also the cached content) is dependent on the customized dependency. For example, server 100 can insert a cache entry into cache 110 that is dependent on a dependency resulting from customized CacheDependency class 114.

Figure 3:
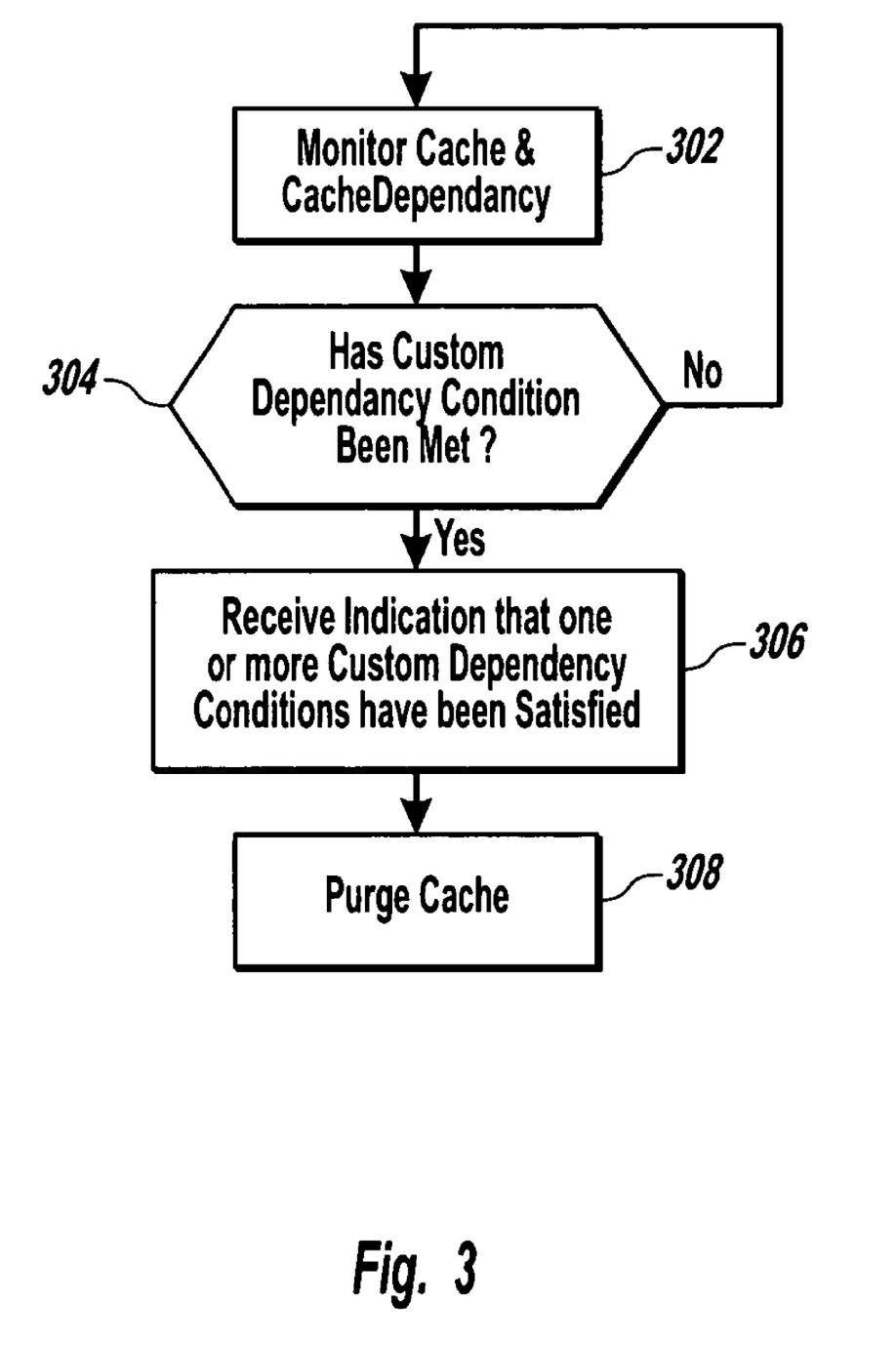
FIG. 3 is am example flow-chart illustrating one embodiment of a method for purging cache entries based on a custom cache dependency.

Referring now to FIG. 3, a method for invalidating a cache entry using a customized CacheDependency is shown. The method in FIG. 3 includes an act of monitoring custom dependency conditions set by an instance of a customized cache dependency (act 302). Act 302 can include a server computer system monitoring custom dependency conditions set by an instance of a customized CacheDependency class implemented at the server computer system. For example, server 100 can monitor custom dependency conditions set by an instance of a customized CacheDependency class 114. A customized dependency condition may be the occurrence of an event, such as, for example, a change in the content of a database or in the content provided by a Web service. For example, server 100 can monitor flag entry 118 for changes in the content of database table 116. When customized CacheDependency class 114 is associated with an aggregate dependency, a plurality of custom dependency conditions can be monitored.

The method of FIG. 3 includes an act of determining if the custom dependency condition has been satisfied (act 304). Act 304 can include a server computer system determining if a custom dependency condition associated with a customized cached dependency has been satisfied. For example, server 100 can determine if a custom dependency condition associated with customized CacheDependency class 114 has been satisfied. When customized CacheDependency class 114 is associated with an aggregate dependency, server 100 can determine if each custom dependency condition in a plurality of custom dependency conditions has been satisfied.

In some embodiments, server 100 determines if a custom dependency condition has been satisfied by comparing a stored flag entry to a current flag entry. For example, server 100 can compare a previously retrieved and stored value for flag entry 118 to a current value for flag entry 118. When the flag entry 118 is incremental, the customized CacheDependency class 114 can compare the flag entry 118 presently in the database table 117 to a flag entry that existed in the database table 117 at some previous time. If the flag entry 118 presently in the table is greater than the flag entry that existed in the database table 117 at some previous time, the custom dependency condition (a change in the content of database table 116) is satisfied.

When a custom dependency condition is not met (NO at act 304), server 100 can again monitor for custom dependency conditions. Monitoring for a custom dependency condition can be repeated at specified intervals (e.g., every 5 seconds), until the custom dependency condition or conditions is/are satisfied, for example, a monitored event occurs (YES at act 304).

The method of FIG. 3 includes an act of indicating that custom dependency conditions have been satisfied (act 306). Act 306 can include a NotifyDependencyChanged method indicating to a server computer system that the custom dependency conditions have been satisfied. For example, a NotifyDependencyChanged method for customized CacheDependency class 114 can notify server 100 when content in database table 116 changes. Notification that a custom dependency condition has been satisfied can indicate to server 100 that a cache entry is to be purged.

The method of FIG. 3 includes purging the cache (act 308). Act 308 can include a server computer system purging a cache entry at the server computer system. For example, server 100 can purge a cache entry from cache 110. A cached entry can be purged in response to receiving a notification that custom dependency conditions associated with a customized cache dependency have been satisfied. For example, server 100 may purge a cached entry dependent on data table 116 in response to receiving a notification that flag entry 118 was incremented. When a cache entry is purged, computer system 100 can release any resources (e.g., system memory) that were being consumed to maintain the cache entry. For example, server computer system 100 can invoke a DependencyDispose method associated with customized CacheDependency class 114 to release resources for a cache entry that stored content from database table 116.

Embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Information may be transferred or provided over a network or another communications connection (either hardwired, wireless, or a combination of hardwired or wireless) to a computer. Thus, any such connection may be used to transfer data to a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
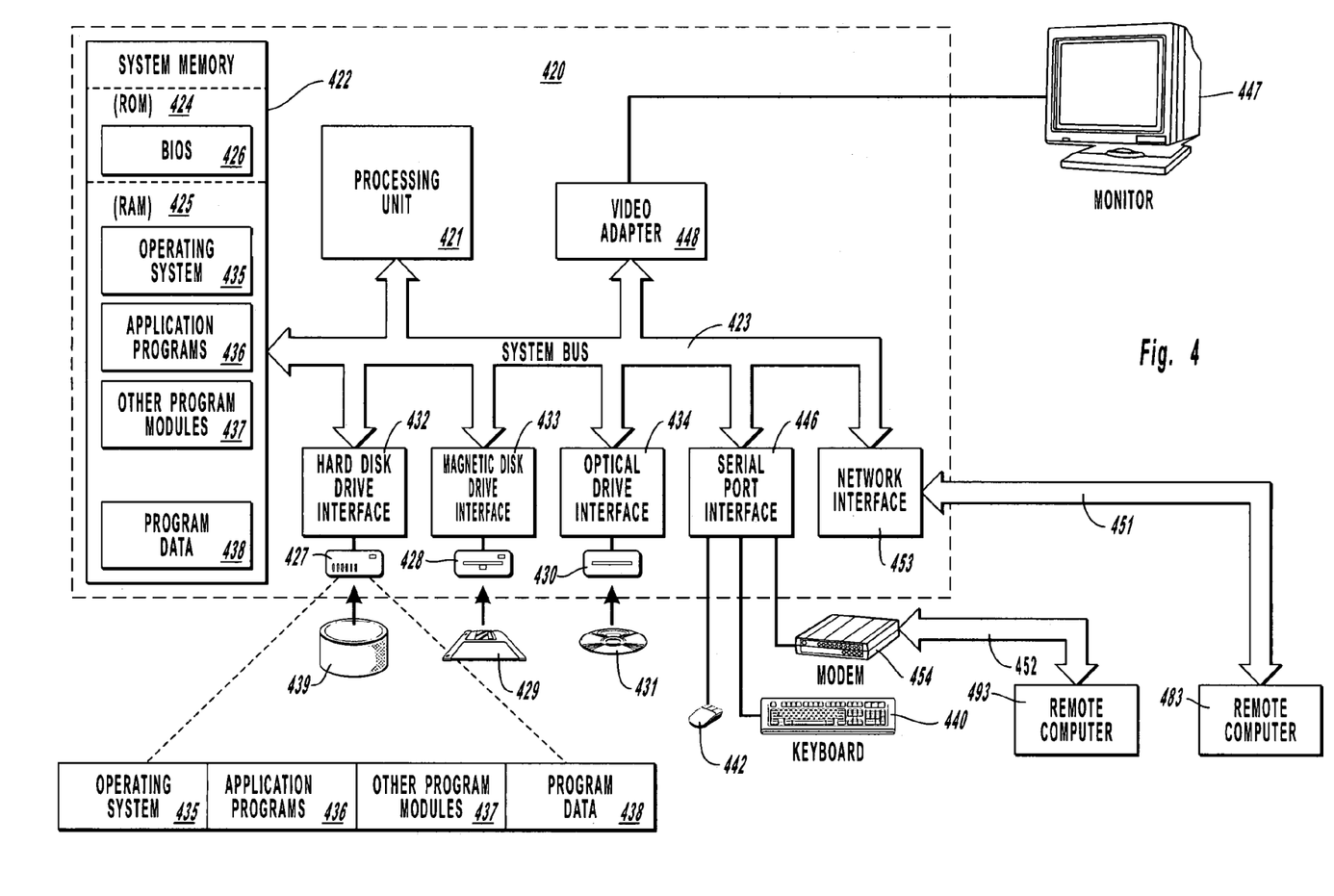
FIG. 4 is a diagrammatic representation of one suitable environment in which aspects of the present invention may be practiced.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

Computer system 420 is connectable to networks, such as, for example, an office-wide or enterprise-wide computer network, an intranet, and/or the Internet. Computer system 420 can exchange data with external sources, such as, for example, remote computer systems, remote applications, and/or remote databases over such a network.

Computer system 420 includes network interface 453, through which computer system 420 receives data from external sources and/or transmits data to external sources. As depicted in FIG. 4, network interface 453 facilitates the exchange of data with remote computer system 483 via link 451. Link 451 represents a portion of a network, and remote computer system 483 represents a node of the network. For example, remote computer system 483 may maintain a database that provides content for Web pages constructed at computer system 420. On the other hand, computer system 483 may be a server computer that requested content from a database maintained at computer system 420.

Likewise, computer system 420 includes serial port interface 446, through which computer system 420 receives data from external sources and/or transmits data to external sources. Serial port interface 446 is coupled to modem 454, through which computer system 420 receives data from and/or transmits data to external sources. Alternately, modem 454 can be a Data Over Cable Service Interface Specification ("DOCSIS") modem or digital subscriber lines ("DSL") modem that is connected to computer system 420 through an appropriate interface. However, as depicted in FIG. 4, serial port interface 446 and modem 454 facilitate the exchange of data with remote computer system 493 via link 452. Link 452 represents a portion of a network, and remote computer system 493 represents a node of the network. For example, remote computer system 493 may a client computer system that requests Web pages from computer system 420. On the other hand, computer system 493 may a server computer system that provides Web pages to computer system 420.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a server computer system that provides Web pages to requesting client computer systems, the Web pages potentially including content from locations that are external to the server computer system, the server computer system including a cache that stores portions of cached content previously received from locations external to the server computer system, a method for determining the validity of a cache entry, the validity of which is dependent on a user-customized dependency, the method comprising the following:

an act of accessing an extensible cache dependency base class from which customized cache dependencies can be derived, the extensible cache dependency base class including a plurality of inheritable cache management methods usable by customized dependencies derived from the extensible case dependency base class to determine the validity of one or more cache entries corresponding to the customized dependencies;

an act of deriving a customized cache dependency class from the extensible cache dependency base class, the customized cache dependency class inheriting the plurality of inheritable cache management methods from the extensible cache dependency base class, the customized cache dependency class also configured to implement further unique functionality of a customized dependency that extends the plurality of inheritable cache management methods included in the extensible cache dependency base class, the unique functionality including providing a user-customized basis for determining the validity of cache entries associated with the customized cache dependency;

an act of accessing a portion of cached content that is to be delivered to a client computer system;

an act of creating a cache entry that associates the customized dependency with the accessed portion of cached content, the customized dependency including the user-customized basis for determining cache entry validity;

an act of determining that the cache entry is valid according to the user-customized basis for determining cache entry validity; and     an act of inserting the determined valid cache entry into cache for delivery to the client computer system.

2. The method set forth in claim 1, wherein the act of accessing an extensible cache dependency base class comprises an act of accessing a cache dependency base class that includes a notify dependency changed method such that classes derived from the cache dependency base class can implement purging functionality of the cache dependency base class by calling the notify dependency changed method.

3. The method set forth in claim 1, wherein the act of accessing an extensible cache dependency base class comprises an act of accessing a cache dependency base class that includes a dependency dispose method such that classes derived from the cache dependency base class can release resources occupied by a cache entry by calling the dependency dispose method.

4. The method set forth in claim 1, wherein the act of deriving a customized cache dependency class from the extensible cache dependency base class comprises an act of deriving a customized cache dependency class that can be implemented to cause a cache entry to be dependent on a database table.

5. The method set forth in claim 1, wherein the act of deriving a customized cache dependency class from the extensible cache dependency base class comprises an act of deriving a customized cache dependency class that can be implemented to cause a cache entry to be dependent on a Web service.

6. The method as recited in claim 1, wherein the act of accessing a portion of content that is to be delivered to a client computer system comprises an act of accessing a portion of content that is to be included in a Web page.

7. The method as recited in claim 1, wherein the act of accessing a portion of content that is to be delivered to a client computer system comprises an act of accessing a portion of content from a database table.

8. The method as recited in claim 1, wherein the act of accessing a portion of content that is to be delivered to a client computer system comprises an act of accessing a portion of content from a Web service.

9. The method as recited in claim 1, wherein the act of creating a cache entry that associates the customized dependency with the accessed portion of content comprises an act of creating a cache entry that causes content from a database table to be dependent on the database table.

10. The method as recited in claim 1, wherein the act of creating a cache entry that associates the customized dependency with the accessed portion of content comprises an act of creating a cache entry that causes content from a database table to be dependent on an aggregate dependency.

11. The method as recited in claim 1, wherein the act of creating a cache entry that associates the customized dependency with the accessed portion of content comprises an act of creating a cache entry that causes content from a Web service to be dependent on the Web service.

12. The method as recited in claim 1, wherein the act of inserting the cache entry into cache such that the validity of the cache entry is dependent on the customized dependency comprises an act of inserting a cache entry that is dependent on a database table.

13. The method as recited in claim 1, wherein the act of inserting the cache entry into cache such that the validity of the cache entry is dependent on the customized dependency comprises an act of inserting a cache entry that is dependent on an aggregate dependency.

14. In a server computer system that provides Web pages to requesting client computer systems, the Web pages potentially including content from locations that are external to the server computer system, the server computer system including a cache that stores portions of cached content previously received from locations external to the server computer system, a method for purging an invalid cache entry, the method comprising the following:

an act of monitoring one or more custom dependency conditions associated with a user-customized basis for determining validity of cache entries, the user-customized basis for determining validity of cache entries being included in an instance of a customized cache dependency that extends a plurality of cache management methods inherited from an extensible cache dependency base class to implement unique functionality, the customized cache dependency corresponding to a customized cache dependency class that was derived from the extensible cache dependency base class, wherein the customized cache dependency includes the user-customized basis for determining cache entry validity;

an act of determining if the one or more custom dependency conditions have been satisfied;

an act of receiving an indication that the one or more custom dependency conditions have been satisfied;

an act of determining that the cache entry associated with the custom dependency conditions is invalid according to the user-customized basis for determining cache entry validity; and an act of purging the cache entry at the server computer system in response to determining that the cache entry is invalid.

15. The method as recited in claim 14, wherein the act of monitoring one or more custom dependency conditions associated with an instance of a customized cache dependency comprises an act of monitoring a database table dependency.

16. The method as recited in claim 14, wherein the act of monitoring one or more custom dependency conditions associated with an instance of a customized cache dependency comprises an act of monitoring a Web services dependency.

17. The method as recited in claim 14, wherein the act of monitoring one or more custom dependency conditions associated with an instance of a customized cache dependency comprises an act of monitoring an aggregate dependency.

18. The method as recited in claim 14, wherein the act of determining if the one or more custom dependency conditions have been be satisfied comprises an act of determining if a flag entry has been incremented.

19. The method as recited in claim 14, wherein the act of determining if the one or more custom dependency conditions have been satisfied comprises an act of determining if a dependency condition associated with an aggregate dependency has been satisfied.

20. The method as recited in claim 14, wherein the act of determining if the one or more custom dependency conditions have been satisfied comprises calling a notify dependency changed method upon the happening of some event specified by an instance of a customized cache dependency class.

21. The method as recited in claim 14, wherein the act of receiving an indication that the one or more custom dependency conditions have been satisfied comprises an act of receiving an indication from a notify dependency changed method that the one or more custom dependency conditions have been satisfied.

22. A computer program product for use in a server computer system that provides Web pages to requesting client computer systems, the Web pages potentially including content from locations that are external to the server computer system, the server computer system including a cache that stores portions of cached content previously received from locations external to the server computer system, the computer program product for implementing a method for determining the validity of a cache entry, the validity of which is dependent on a user-customized dependency, the computer program product comprising one or more computer-readable storage media having stored thereon computer executable instructions that, when executed by a processor, cause the server computer system to perform the following:

access an extensible cache dependency base class from which customized cache dependencies can be derived, the extensible cache dependency base class including a plurality of inheritable cache management methods usable by customized dependencies derived from the extensible case dependency base class to determine the validity of one or more cache entries corresponding to the customized dependencies;

derive a customized cache dependency class from the extensible cache dependency base class, the customized cache dependency class inheriting the plurality of inheritable cache management methods from the extensible cache dependency base class, the customized cache dependency class also configured to implement further unique functionality of a customized dependency that extends the plurality of inheritable cache management methods included in the extensible cache dependency base class, the unique functionality including providing a user-customized basis for determining the validity of cache entries associated with the customized cache dependency;

access a portion of cached content that is to be delivered to a client computer system;

create a cache entry that associates the customized dependency with the accessed portion of cached content, the customized dependency including the user-customized basis for determining cache entry validity;

determine that the cache entry is valid according to the user-customized basis for determining cache entry validity; and insert the determined valid cache entry into cache for delivery to the client computer system.

23. A computer program product for use in a server computer system that provides Web pages to requesting client computer systems, the Web pages potentially including content from locations that are external to the server computer system, the server computer system including a cache that stores portions of cached content previously received from locations external to the server computer system, the computer program product for implementing a method for purging an invalid cache entry, the computer program product comprising one or more computer-readable storage media having stored thereon computer executable instructions that, when executed by a processor, cause the server computer system to perform the following:

monitor one or more custom dependency conditions associated with a user-customized basis for determining validity of cache entries, the user-customized basis for determining validity of cache entries being included in an instance of a customized cache dependency that extends a plurality of cache management methods inherited from an extensible cache dependency base class to implement unique functionality, the customized cache dependency corresponding to a customized cache dependency class that was derived from the extensible cache dependency base class, wherein the customized cache dependency includes the user-customized basis for determining cache entry validity;

determine if the one or more custom dependency conditions have been satisfied;

receive an indication that the one or more custom dependency conditions have been satisfied;

determine that the cache entry associated with the custom dependency conditions is invalid according to the user-customized basis for determining cache entry validity; and purge the cache entry at the server computer system in response to determining that the cache entry is in valid.

24. In a server computer system that provides Web pages to requesting client computer systems, the Web pages potentially including content from locations that are external to the server computer system, the server computer system including a cache that stores portions of cached content previously received from locations external to the server computer system, a method for determining the validity of a cache entry, the validity of which is dependent on a user-customized dependency, the method comprising the following:

an act of accessing an extensible cache dependency base class from which customized cache dependencies can be derived, the extensible cache dependency base class including a plurality of inheritable cache management methods usable by customized dependencies derived from the extensible case dependency base class to determine the validity of one or more cache entries corresponding to the customized dependencies;

an act of deriving a customized cache dependency class from the extensible cache dependency base class, the customized cache dependency class inheriting the plurality of inheritable cache management methods from the extensible cache dependency base class, the customized cache dependency class also configured to implement further unique functionality of a customized dependency that extends the plurality of inheritable cache management methods included in the extensible cache dependency base class, the unique functionality including providing a user-customized basis for determining the validity of cache entries associated with the customized cache dependency, the user-customized basis including a selectable set of elements on which validity of the cache entries can depend;

an act of accessing a portion of cached content that is to be delivered to a client computer system;

an act of creating a cache entry that associates the customized dependency with the accessed portion of cached content, the customized dependency including the user-customized basis for determining cache entry validity;

an act of determining that the cache entry is valid according to the user-customized basis for determining cache entry validity; and an act of inserting the determined valid cache entry into cache for delivery to the client computer system.

25. The method of claim 24, wherein the selectable set of elements on which validity of the cache entries can depend comprises one or more of the following: web service element, a database table element, a local file change, a dependency derived from the extensible cache dependency base class, a notification flag, and a software application.

26. The method of claim 1, wherein the functionality of the customized cache dependencies override any functionality of the extensible cache dependency base class.

27. The method of claim 1, wherein the functionality of the customized cache dependencies selectively override one or more portions of functionality of the extensible cache dependency base class.

28. The method of claim 1, wherein the customized cache dependency is dependent on both a file and a database table.

29. The method of claim 1, wherein the unique functionality comprises being notified when a database query changes.

30. The method of claim 1, wherein the customized cache dependency is dependent on another dependency.

* * * * *